United States Patent
Muller et al.

(10) Patent No.: US 10,296,362 B2
(45) Date of Patent: May 21, 2019

(54) EXECUTION OF A SCRIPT BASED ON PROPERTIES OF A VIRTUAL DEVICE ASSOCIATED WITH A VIRTUAL MACHINE

(71) Applicant: Red Hat Israel, Ltd., Raanana (IL)

(72) Inventors: Assaf Muller, Raanana (IL); Dan Kenigsberg, Dublin (IE)

(73) Assignee: Red Hat Israel, Ltd., Raanana (IL)

(*) Notice: Subject to any disclaimer, the term of this patent is extended or adjusted under 35 U.S.C. 154(b) by 216 days.

(21) Appl. No.: 14/191,322

(22) Filed: Feb. 26, 2014

(65) Prior Publication Data

US 2015/0242225 A1 Aug. 27, 2015

(51) Int. Cl.

| | |
|---|---|
| *G06F 21/56* | (2013.01) |
| *G06F 17/30* | (2006.01) |
| *G06F 9/455* | (2018.01) |
| *G06F 9/44* | (2018.01) |
| *G06F 9/54* | (2006.01) |
| *G06F 11/30* | (2006.01) |
| *G06F 16/10* | (2019.01) |

(52) U.S. Cl.
CPC ...... *G06F 9/45533* (2013.01); *G06F 9/45558* (2013.01); *G06F 9/542* (2013.01); *G06F 9/45504* (2013.01); *G06F 9/45512* (2013.01); *G06F 11/3006* (2013.01); *G06F 16/10* (2019.01)

(58) Field of Classification Search
CPC ............ G06F 11/368; G06F 11/3419; G06F 11/3688; G06F 8/00; G06F 8/61; G06F 8/65; G06F 9/4401; G06F 9/4423; G06F 9/444; G06F 9/45533; G06F 9/45558; G06F 9/45529; G06F 21/14; G06F 21/60; G06F 17/30233; G06F 8/63; G06F 9/455; G06F 9/45504; G06F 9/542; G06F 9/5077; G06F 11/3006; G06F 11/3664; G06F 11/366; G06F 11/3409; G06F 11/3495; G06F 9/54; G06F 17/30011; G06F 11/1438; G06F 17/30067; G06F 11/364; G06F 9/45512; G06F 9/468; H04L 67/42; G06Q 10/06311
See application file for complete search history.

(56) References Cited

U.S. PATENT DOCUMENTS 6,493,755 B1 * 12/2002 Hansen ............... H04L 41/0609
709/224
6,650,635 B1 * 11/2003 Weinstein ........... H04M 1/2535
370/352

(Continued)

OTHER PUBLICATIONS

Jiang Bo et al., MobileTest: A Tool Supporting Automatic Black Box Test for Software on Smart Mobile devices, May 20-26, 2007, [Retrieved on Jan. 10, 2019]. Retrieved from the internet: <URL: http://delivery.acm.org/10.1145/1280000/1270261/29710008.pdf> 7 Pages (1-7) (Year: 2007).*

(Continued)

*Primary Examiner* — Anibal Rivera
(74) *Attorney, Agent, or Firm* — Womble Bond Dickinson (US) LLP; Daniel E. Ovanezian

(57) ABSTRACT

An event associated with a virtual machine may be identified. Furthermore, a script associated with the event may be identified. A property of a virtual device that is assigned to the virtual machine may be received. A determination may be made to execute the script or not to execute the script for the virtual machine based on the property of the virtual device that is assigned to the virtual machine.

19 Claims, 5 Drawing Sheets

(56) References Cited

U.S. PATENT DOCUMENTS

| | | | | |
|---|---|---|---|---|
| 6,678,705 | B1* | 1/2004 | Berchtold | G06F 17/30011 |
| 8,190,641 | B2* | 5/2012 | Ponnappan | G06F 17/30067 |
| | | | | 707/786 |
| 8,443,365 | B2* | 5/2013 | Kumar | G06F 9/45558 |
| | | | | 714/1 |
| 8,839,245 | B1* | 9/2014 | Khajuria | G06F 17/30233 |
| | | | | 718/1 |
| 9,451,006 | B1* | 9/2016 | Miller | H04L 67/42 |
| 2003/0167421 | A1* | 9/2003 | Klemm | G06F 9/3861 |
| | | | | 714/37 |
| 2003/0233476 | A1* | 12/2003 | Henry | H04L 51/26 |
| | | | | 709/245 |
| 2004/0128585 | A1* | 7/2004 | Hind | G06F 11/366 |
| | | | | 714/38.14 |
| 2005/0165881 | A1* | 7/2005 | Brooks | G06F 9/5027 |
| | | | | 709/200 |
| 2005/0231746 | A1* | 10/2005 | Parry | H04N 1/00352 |
| | | | | 358/1.13 |
| 2006/0136914 | A1* | 6/2006 | Marascio | G06F 11/3664 |
| | | | | 718/100 |
| 2006/0167891 | A1* | 7/2006 | Blaisdell | G06F 11/3495 |
| 2006/0262915 | A1* | 11/2006 | Marascio | H04L 65/1053 |
| | | | | 379/201.01 |
| 2007/0078841 | A1* | 4/2007 | Lin | H04L 41/0253 |
| 2008/0195624 | A1* | 8/2008 | Ponnappan | G06F 17/30067 |
| 2009/0100420 | A1* | 4/2009 | Sapuntzakis | G06F 8/65 |
| | | | | 717/171 |
| 2010/0074173 | A1* | 3/2010 | Ewing | H04L 1/1867 |
| | | | | 370/328 |
| 2010/0185930 | A1* | 7/2010 | Scott | G06F 9/54 |
| | | | | 715/222 |
| 2010/0235831 | A1* | 9/2010 | Dittmer | G06F 9/45558 |
| | | | | 718/1 |
| 2011/0022695 | A1* | 1/2011 | Dalal | G06F 9/5077 |
| | | | | 709/222 |
| 2011/0046453 | A1* | 2/2011 | Keil | A61B 5/1411 |
| | | | | 600/309 |
| 2011/0197189 | A1* | 8/2011 | Wagner | G06F 11/3006 |
| | | | | 718/1 |
| 2011/0197205 | A1* | 8/2011 | Wagner | G06F 9/542 |
| | | | | 719/316 |
| 2011/0265087 | A1* | 10/2011 | Chen | G06F 11/3051 |
| | | | | 718/102 |
| 2011/0269111 | A1* | 11/2011 | Elesseily | G06Q 10/06 |
| | | | | 434/362 |
| 2012/0054736 | A1* | 3/2012 | Arcese | G06F 8/65 |
| | | | | 717/172 |
| 2012/0110574 | A1* | 5/2012 | Kumar | G06F 9/45558 |
| | | | | 718/1 |
| 2012/0284628 | A1* | 11/2012 | Wong | H04L 67/306 |
| | | | | 715/736 |
| 2012/0284712 | A1* | 11/2012 | Nimmagadda | G06F 9/5077 |
| | | | | 718/1 |
| 2013/0007739 | A1* | 1/2013 | Poddar | G06F 8/63 |
| | | | | 718/1 |
| 2013/0044107 | A1* | 2/2013 | Burch | G06T 19/20 |
| | | | | 345/419 |
| 2013/0047039 | A1* | 2/2013 | Manes | G06F 11/3409 |
| | | | | 714/47.1 |
| 2013/0139155 | A1* | 5/2013 | Shah | G06F 9/45558 |
| | | | | 718/1 |
| 2013/0185715 | A1* | 7/2013 | Dunning | G06F 9/45558 |
| | | | | 718/1 |
| 2014/0115098 | A1* | 4/2014 | Reich | H04N 21/4334 |
| | | | | 709/217 |
| 2014/0149978 | A1* | 5/2014 | Subramanya | G06F 9/45512 |
| | | | | 718/1 |
| 2014/0196029 | A1* | 7/2014 | Kannan | G06F 9/45504 |
| | | | | 718/1 |
| 2014/0283065 | A1* | 9/2014 | Teddy | H04L 63/145 |
| | | | | 726/23 |
| 2014/0283066 | A1* | 9/2014 | Teddy | G06F 21/56 |
| | | | | 726/23 |
| 2014/0289853 | A1* | 9/2014 | Teddy | H04L 63/1416 |
| | | | | 726/23 |
| 2014/0380308 | A1* | 12/2014 | Hassine | G06F 9/45558 |
| | | | | 718/1 |
| 2015/0058054 | A1* | 2/2015 | Basu | G06Q 10/06311 |
| | | | | 705/7.13 |
| 2015/0058837 | A1* | 2/2015 | Govindankutty | G06F 9/45533 |
| | | | | 718/1 |
| 2015/0074646 | A1* | 3/2015 | Herrin | G06F 11/368 |
| | | | | 717/124 |
| 2015/0121086 | A1* | 4/2015 | Smith | G06F 21/72 |
| | | | | 713/189 |
| 2015/0128125 | A1* | 5/2015 | Wilkinson | G06F 9/468 |
| | | | | 717/171 |

OTHER PUBLICATIONS

Haikun Liu et al., Live Migration of Virtual Machine Based on Full System Trace and Replay, Jun. 11-13, 2009, [Retrieved on Jan. 10, 2019]. Retrieved from the internet: <URL: http://delivery.acm.org/10.1145/1560000/1551630/p101-liu.pdf> 10 Pages (101-110) (Year: 2009).*

* cited by examiner

EXECUTION OF A SCRIPT BASED ON PROPERTIES OF A VIRTUAL DEVICE ASSOCIATED WITH A VIRTUAL MACHINE

TECHNICAL FIELD

Aspects of the disclosure generally relate to virtual machines and, more specifically, relate to an execution of a script based on properties of a virtual device associated with a virtual machine.

BACKGROUND

A virtual machine (VM) may be considered a software-based emulation of computer hardware. For example, the virtual machine may operate based on computer architecture and functions of the computer hardware resources. Thus, the virtual machine may emulate a physical computing environment, but requests for CPU, memory, hard disk, network, and other hardware resources may be managed by a virtualization layer which translates these requests to the underlying physical computing hardware resources.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
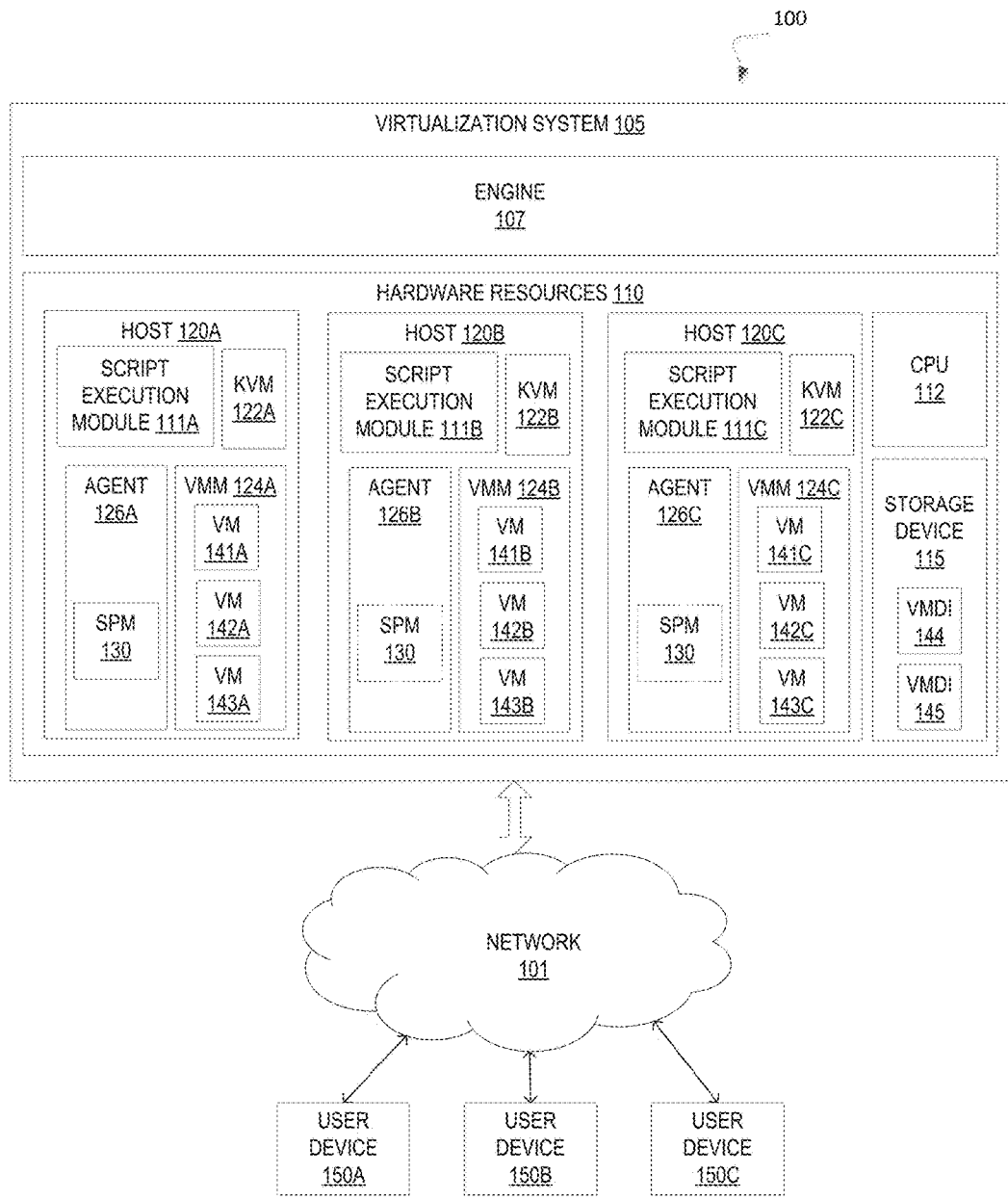
FIG. 1 illustrates an example system architecture in which embodiments of the disclosure may operate.

Embodiments of the disclosure relate to a script execution module to execute a script based on the occurrence of an event associated with a virtual machine and properties of virtual devices assigned to the virtual machine. A script (also referred to as a hook) may be used to execute one or more commands in response to conditions of the script being met or satisfied. In some embodiments, a script may be event-driven in that the occurrence of a particular event (e.g., the migration of a virtual machine, provisioning of a virtual machine, etc.) may be required before the script is executed.

The execution of an event-driven script may be applied to all virtual machines associated with the event. For example, a host system that operates virtual machines may be associated with a script that is executed in response to the start of a virtual machine. Thus, if any virtual machine is started on the host system, the script will be executed to perform one or more commands or operations on the virtual machine that is started. As such, such an event-driven script may be executed on multiple virtual machines that are started on the host system.

However, in some embodiments, it may be desirable to have the script be executed on specific virtual machines associated with the event (e.g., the start of a virtual machine) instead of any virtual machine that is associated with the event. As such, using an event-driven and property-driven script may provide for a more detailed level of granularity for determining when to execute a script for a virtual machine. For example, the script may also be property-driven in that the script may be executed on a virtual machine if one or more properties of the virtual machine match or satisfy conditions specified or required by the script.

Virtual machines may include virtual devices. Examples of virtual devices include, but are not limited to, virtual disks, virtual interfaces (e.g., virtual network interface controllers (vNIC)), virtual video devices, virtual sound devices, virtual controllers, etc. A virtual device may be assigned a property (i.e., a custom property). For example, a vNIC of a virtual machine may be assigned a configuration or property value. The value assigned to the virtual device may be used when executing the script. For example, the script may be executed on a virtual machine with a virtual device that has been assigned a value that is specified or required by the script. Thus, the value of a virtual device that is assigned to the virtual machine may be considered to be the property that must be satisfied in order for the script to be executed after the occurrence of the event.

In some embodiments, a script execution module may provide an event-driven and property-driven execution of the script. For example, the script execution module may identify the occurrence of an event associate with a virtual machine. A script associated with the event may be received. Furthermore, properties of the virtual devices of the virtual machine may be received. The script execution module may compare the properties of the virtual devices with conditions or parameters of the script that is associated with the event. If the properties of the virtual devices match or satisfy the conditions or parameters of the script, then the script may be executed on the virtual machine. For example, in some embodiments, the execution of the script on the virtual machine may manipulate or run operations for the virtual device of the virtual machine. However, if the properties of the virtual devices do not match or satisfy the conditions or parameters of the script, then the script may not be executed on the virtual machine.

FIG. 1 illustrates an example system architecture 100 in which embodiments of the disclosure may operate. The system architecture 100 includes a virtualization system 105 coupled to and accessible over a network 101 by a number of user devices 150A-150C. The virtualization system 105 includes a variety of hardware resources 110 which may include, but is not limited to, desktop computers, laptop computers, rackmount servers, routers, switches, tablet computers, mobile phones, or any other type of computing device. The hardware resources 110 may include one or more processing devices, memory, and/or additional devices including, but not limited to, a graphics card, hardware RAID controller, network controller, hard disk drive, universal serial bus (USB) device, internal input/output (I/O) device, keyboard, mouse, speaker, etc. The hardware resources 110 may be used to execute software, including one or more operating systems, virtual machines, or other applications. The virtualization system also includes an engine 107 (which may execute on a portion of the hardware resources 110 or a separate engine device) that manages the hardware resources 110 and the processes running on the hardware resources 110.

The hardware resources 110 include a number of hosts 120A-120C (or host machines or systems) each including a portion of the hardware resources 110. The hosts 120A-120C may each include one or more processing devices and one or more storage devices. The hardware resources 110 may further include one or more additional processing devices 112 and one or more additional storage devices 115.

Each of the hosts 120A-120C includes a kernel space and a user space defined by the hardware resources of the host 120A-120C. A kernel-based virtual machine (KVM) 122A-122C is executed in the kernel space of the host 120A-120C. The KVM 122A-122C allows a host 120A-120C to make its hardware resources available to virtual machines 141A-143C which may be executed in the user space.

Each of the hosts 120A-120C may execute a virtual machine monitor (VMM) 124A-124C (or a hypervisor). The VMM 124A-124C is an application that executes on a host 120A-120C to manage virtual machines 141A-143C. In particular, the VMM 124A-124C may instantiate or start, migrate, pause, or perform another type of event associated with virtual machines 141A-143C. The VMM 124A-124C may include a virtualization API and a multi-platform emulator. Each virtual machine 141A-143C may execute a guest operating system that can be accessed by a user device 150A-150C over the network 101. Each virtual machine 141A-143C may further run guest applications using the guest operating system.

Each of the hosts 120A-120C may include an agent 126A-126C. The agent 126A-126C may facilitate inter-host communication and perform various monitoring and administrative tasks. The agent 126A-126C may also include functionality for acting as a storage pool manager (SPM) 130. However, in some embodiments, one of the hosts 120A may be active as the SPM at any one time. The host 120A may be designated an active SPM 130 by the engine 107. The SPM 130 coordinates metadata changes in the virtualization system 105, such as creating and deleting disk images, creating and merging snapshots, copying images between storage domains, creating templates and storage allocation for block devices of the hardware resources 110 such as hard drives or other storage devices.

A storage domain is a collection of data structures that have a common storage interface. A storage domain may contain complete images of templates and virtual machines (including snapshots). A storage domain may comprise one or more block devices, one or more storage devices, one or more file systems, one or more volumes, and/or portions thereof.

As shown in FIG. 1, each of the hosts 120A-120C may include a script execution module 111A-111C. In some embodiments, the script execution modules 111A-111C may store scripts (also referred to as hooks) that may include operations or commands to be performed on the virtual machines 141A-141C, 142A-142C, and 143A-143C. The script may be executed in response to an event associated with any of the virtual machines 141A-141C, 142A-142C, and 143A-143C. For example, the virtual machine 141A may be started or initiated on the host 120A and the starting or initiating of the virtual machine 141A may be considered an event. In response to the event, the script execution module 111A of the host 120A may execute a stored script. Further details with regard to the script execution modules 111A-111C are disclosed below.

Furthermore, in some embodiments, each event may be associated with a folder on a file system of the host systems 120A-120C. For example, a user may write a script and place the script in the folder. If an event associated with the folder is identified, then the script may be executed as may other scripts in the folder.

Figure 2:
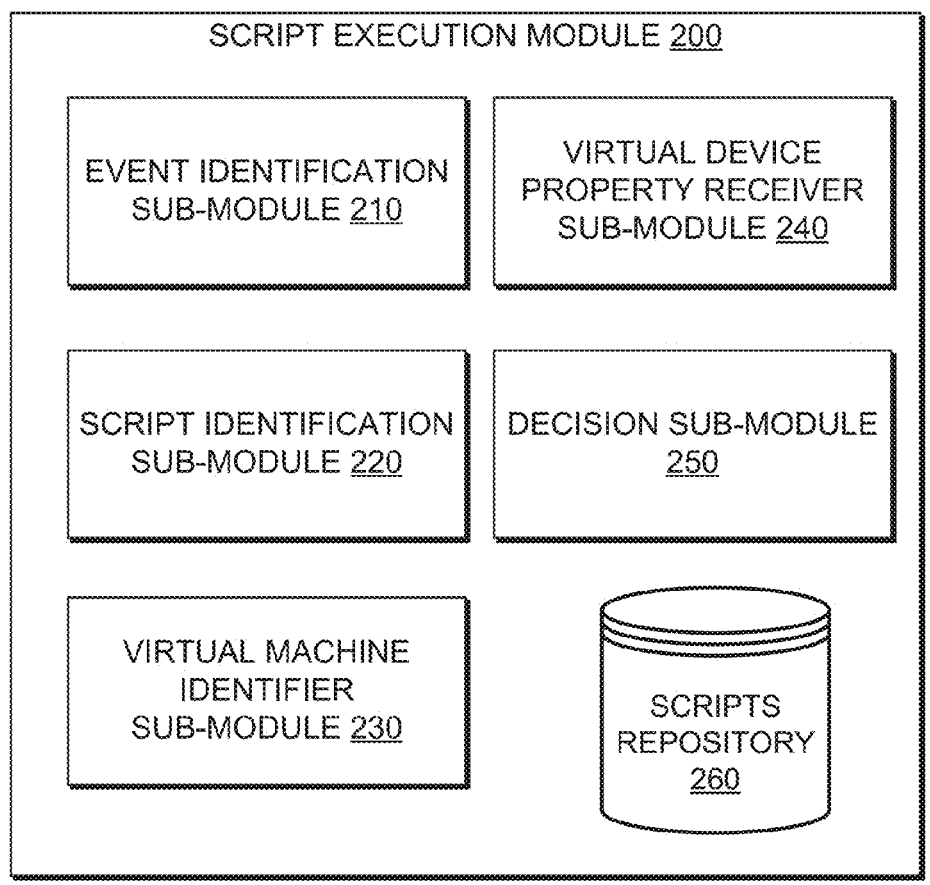
FIG. 2 is a block diagram of an example script execution module in accordance with some embodiments of the disclosure.

FIG. 2 is a block diagram of an example script execution module 200 in accordance with some embodiments of the disclosure. In general, the script execution module 200 may correspond to the script execution module 111A-111C of FIG. 1. The script execution module 200 may include an event identification sub-module 210, a script identification sub-module 220, a virtual machine identifier sub-module 230, a virtual device property receiver sub-module 240, a decision sub-module 250, and a scripts repository 260. In alternative embodiments, the functionality of one or more of the sub-modules may be combined or divided.

As shown in FIG. 2, the script execution module 200 may include an event identification sub-module 210. In some embodiments, the event identification sub-module 210 may identify an event associated with a virtual machine. For example, the event identification sub-module 210 may identify that the virtual machine has been or is to be started, migrated, etc. or a virtual device of the virtual machine is to be connected or disconnected. Examples of events include, but are not limited to, the starting of a virtual machine, the ending of a virtual machine, the connecting (i.e., plugging in) of a virtual device of the virtual machine, disconnecting (i.e., unplugging) of a virtual device of the virtual machine, migrating the virtual machine, and updating a virtual device of the virtual machine. In some embodiments, examples of connecting or disconnecting a virtual device to or from the virtual machine may include, but are not limited to, connecting or disconnecting a virtual network interface and connecting or disconnecting a virtual disk. In some embodiments, the identified event may be associated with a host system that operates or runs a virtual machine. For example, the event may be a networking operation of the host system. Furthermore, in the same or alternative embodiments, the event may be associated with a virtual desktop and server management (VDSM) module that may manage hypervisors of a host system and/or the host system. Thus, the event may be any type of event in the life cycle of a virtual machine, host system, or the virtual desktop and server management.

Returning to FIG. 2, the script execution module 200 may include a script identification sub-module 220. In some embodiments, the script identification sub-module 220 may identify a script based on the event that has been identified by the event identification sub-module 210. For example, a scripts repository 260 may store multiple different scripts that each may include commands or operations to be performed on a virtual machine or a virtual device of a virtual machine if the script is executed or run. In some embodiments, each of the scripts may require an event to occur as a prerequisite or condition for the script to be executed or run. For example, if a migration of a virtual machine is identified then scripts in the scripts repository 260 that are associated with the migration of a virtual machine may be identified by the script identification sub-module 220.

The script execution module 200 may include a virtual machine identifier sub-module 230. In some embodiments, the virtual machine identifier sub-module 230 may identify a particular virtual machine associated with the event. For example, the virtual machine identifier sub-module 230 may identify virtual machines that are subject to a migration event. Furthermore, the virtual device property receiver 240 may receive properties of virtual devices of the virtual machine that have been identified by the virtual machine identifier sub-module 230. Examples of a virtual device may include, but are not limited to, virtual disks, virtual network interface controllers (vNICs), video devices, sound devices, etc. In some embodiments, a virtual device may be assigned a property. For example, a virtual device may be assigned a value corresponding to a property of the virtual device. As an example, a virtual machine may be assigned a particular type of virtual network card and a property identifying the virtual network card may have a value of 'ON.'

As shown in FIG. 2, the script execution module 200 may further include a decision sub-module 250. In some embodiments, the decision sub-module 250 may determine whether to execute or not to execute a script identified by the script identification sub-module 220 based on the event identified by the event identification sub-module 210 and the virtual device properties received from the virtual device property receiver sub-module 240. For example, a script that is associated with an event may include a condition associated with a virtual device property. If the event that has been identified and the virtual device property that has been received satisfies or meets the condition of the script, then the script may be executed. As an example, a script may specify a required event of a migration of a virtual machine and a virtual device property condition of 'ON' for a virtual network card. If the migration of a virtual machine is identified and the virtual machine to be migrated has a virtual device property condition of 'ON' for the virtual network card of the virtual machine, then the script may be executed for the virtual machine.

In some embodiments, the execution of a script may perform one or more commands or actions on the virtual machine. For example, the commands or actions of a script may result in, but are not limited to, connecting a virtual disk of the virtual machine to a particular type of storage server or connecting the vNIC of the virtual machine to a particular type of network. Thus, the execution of a script may perform one or more commands or actions on a virtual device of the virtual machine.

Figure 3:
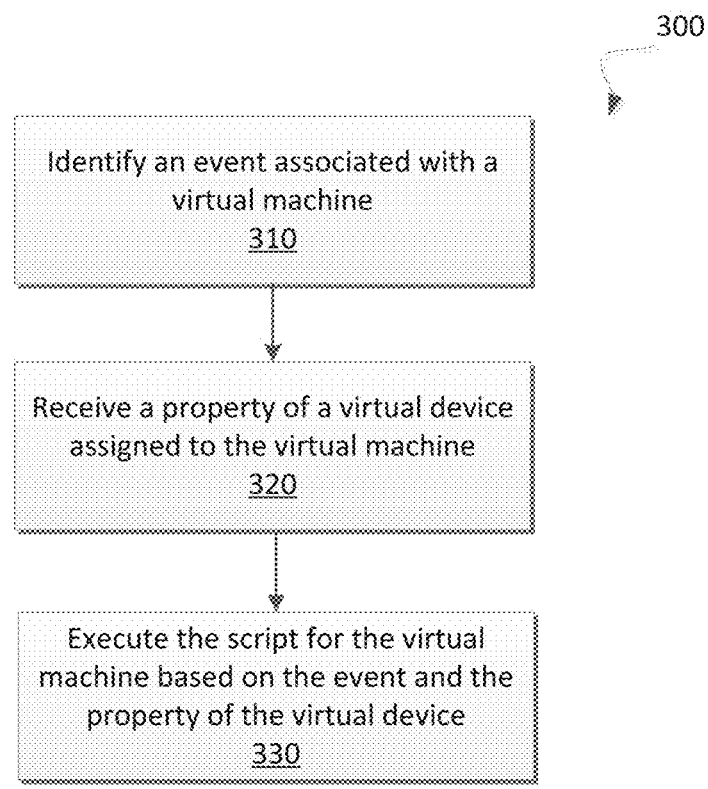
FIG. 3 is an illustrated example method to execute a script in accordance with some embodiments.

FIG. 3 illustrates an example method 300 to execute a script in accordance with some embodiments. The method 300 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 300 may be performed by the script execution module 200 of FIG. 2.

As shown in FIG. 3, the method 300 may begin with the processing logic identifying an event associated with a virtual machine (or a host system, VDSM, etc.) (block 310). For example, the processing logic may identify that a virtual machine has been provisioned or started on a host system. The processing logic may further receive a property of a virtual device of the virtual machine (block 320). For example, the processing logic may receive a value of 'ON' for a particular virtual network interface card of the virtual machine that has been provisioned or started on the host machine. Furthermore, the processing logic may execute a script based on or in view of the event associated with the virtual machine and the property of the virtual device of the virtual machine (block 330). For example, if a particular script specifies a requirement or condition of a start event for a virtual machine and a value of 'ON' for the virtual network interface card property of a virtual machine, then the script may be executed on the virtual machine and/or the virtual device of the virtual machine. For example, the script may connect the virtual network interface card (vNIC) of the virtual machine to a particular type of network associated with a host system. In some embodiments, the properties of the virtual device, virtual machine, host system, and/or virtual desktop and server management module may be sent or passed to a script to be used in the execution of the script. For example, an event associated with a host system may be detected. The event may be a new network being associated or defined on the host system and a property identifying the name of the new network on the host system may be sent or transmitted to the script. In some embodiments, the name of the new network may be used during the execution of the script (e.g., to use the new network name to connect the new network to a vNIC).

Thus, a script may be executed to perform one or more actions or commands on a virtual machine and/or the virtual device of a virtual machine based on an event and a property of a virtual device of the virtual machine matching conditions or requirements of the script.

Figure 4:
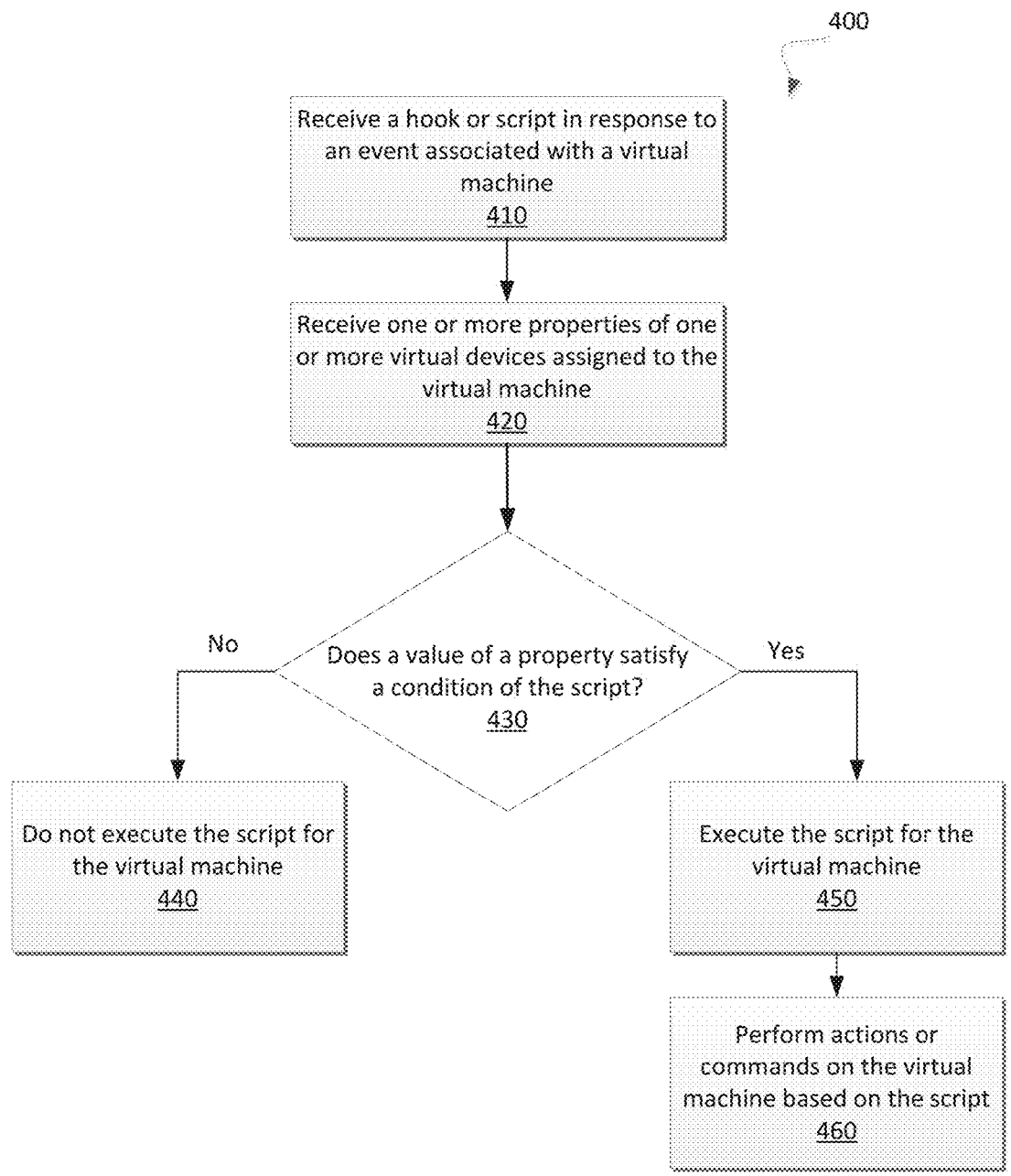
FIG. 4 is an illustrated example method to execute a script in view of a property of a virtual device of a virtual machine in accordance with some embodiments of the disclosure.

FIG. 4 illustrates an example method 400 to execute a script in view of a property of a virtual device of a virtual machine in accordance with some embodiments of the disclosure. The method 400 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 400 may be performed by the script execution module 200 of FIG. 2.

As shown in FIG. 4, the method 400 may begin with the processing logic receiving a script (also referred to as a hook) in response to an event associated with a virtual machine (or a host system, VDSM, etc.) (block 410). The processing logic may further receive one or more properties of one or more virtual devices that have been assigned to the virtual machine (block 420). Furthermore, the processing logic may determine if a value of a property assigned to one of the virtual devices of the virtual machine satisfies a condition or requirement of the script (block 430). If the value of the property of the virtual device assigned to the virtual machine does not satisfy the condition or requirement specified by the script, then the processing logic may not execute the script for the virtual machine or the virtual device of the virtual machine (block 440). However, if the value of the property of the virtual device assigned to the virtual machine does satisfy the condition or requirement specified by the script, then the processing logic may execute the script for the virtual machine and/or the virtual device of the virtual machine (block 450). Furthermore, the processing logic may perform one or more actions or commands on the virtual machine and/or the virtual device of the virtual machine based on the script.

In some embodiments, a script may be specified to occur before or after a particular type of event associated with a virtual machine or a virtual device of a virtual machine. For example, a script may specify that it is to be executed before or after the stopping of a virtual machine, before or after the start of a virtual machine, before or after the ending or destroying of a virtual machine, before or after the pausing of a virtual machine, before or after the unpausing of a virtual machine, before or after the hibernating of a virtual machine, before or after the de-hibernating of a virtual machine, before or after the migration of a virtual machine, before or after the disconnecting of a virtual device of a virtual machine, before or after the connecting of a virtual device of a virtual machine, etc. Furthermore, the script may be executed on a host system to perform one or more actions or commands on a virtual machine. In some embodiments, the host system may run multiple virtual machines. A first subset of the virtual machines run on the host system may have an assigned property of a virtual device and the second subset of the virtual machines that run on the host system may not have the assigned property of the virtual device. Thus, if a script specifies a condition that includes the assigned property of the virtual device, then the script may be executed to perform actions or commands on the first subset of the virtual machines that run on the host system and to not execute the script to perform actions or commands on the second subset of the virtual machines that run on the host system.

Figure 5:
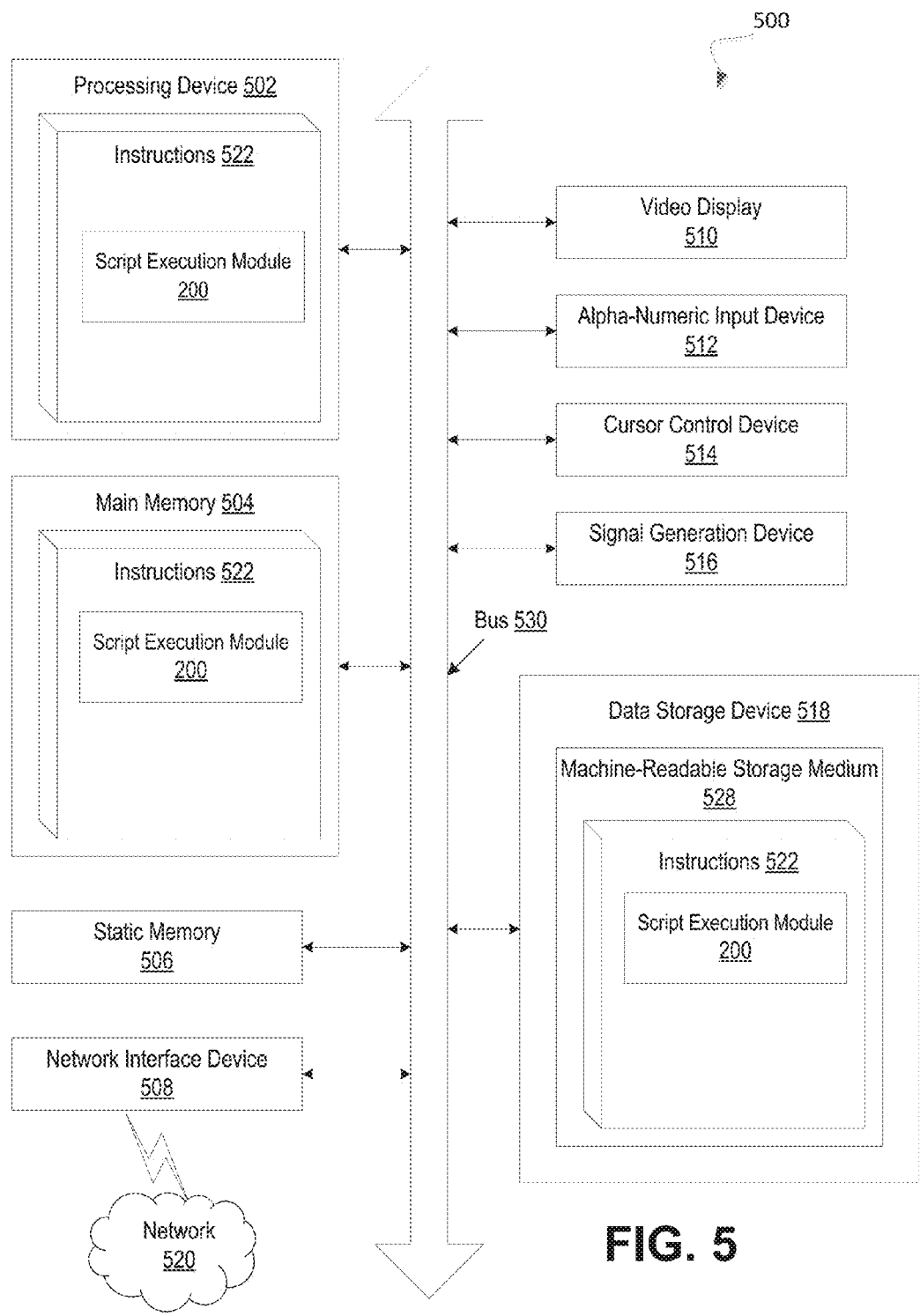
FIG. 5 illustrates a block diagram of an embodiment of a computer system in which some embodiments of the disclosure may operate.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528 (also known as a computer-readable medium) on which is stored one or more sets of instructions or software 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting machine-readable storage media.

In one implementation, the instructions 522 include instructions for a row module (e.g., script execution module 111A-111C of FIG. 1 and/or script execution module 200 of FIG. 2) and/or a software library containing methods that call modules or sub-modules in a script execution module. While the machine-readable storage medium 528 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   identifying a first type of event of a plurality of types of events occurring on a virtual machine being supported by a host system, each of the plurality of types of events being different from each other of the plurality of types of events;
   identifying a location of the host system that is associated with the identified first type of event that has occurred with the virtual machine provided by the host system;
   identifying a script corresponding to the identified first type of event and at the location of the host system that is associated with the identified first type of event, wherein the script is configured to be executed in accordance with the first type of event of the plurality of types of events;
   receiving a property of a virtual device that is assigned to the virtual machine, wherein the property comprises an operating status of the virtual device assigned to the virtual machine;
   determining, by a processing device, whether to execute the script for the virtual machine in view of the property of the virtual device that is assigned to the virtual machine satisfying a condition in the script; and
   in response to determining that a value of the property of the virtual device that is assigned to the virtual machine satisfies the condition in the script, executing the script in accordance with the first type of event to perform an operation on the virtual device of the virtual machine in view of a property of the host system.

2. The method of claim 1, wherein the script is determined to not be executed when the value of the property of the virtual device assigned to the virtual machine does not satisfy the condition in the script.

3. The method of claim 1, further comprising:
   identifying a second virtual machine associated with the event; and
   receiving a second property of a second virtual device assigned to the second virtual machine, wherein the executing of the script performs an operation on the second virtual machine when the second property of the second virtual device assigned to the second virtual machine satisfies the condition in the script.

4. The method of claim 3, wherein the executing of the script does not perform the operation on the second virtual machine when the second property of the second virtual device assigned to the second virtual machine does not satisfy the condition.

5. The method of claim 1, wherein the event is an action performed on the virtual machine at the host system.

6. The method of claim 1, wherein the host system is associated with running the virtual machine, and the property of the host system is used by the script to configure the virtual device of the virtual machine when the script is executed.

7. The method of claim 1, wherein the location of the host system is a folder of a file system of the host system.

8. The method of claim 1, wherein the plurality of types of events comprises a stopping of the virtual machine, a start of the virtual machine, a destruction of the virtual machine, a pausing of the virtual machine, an unpausing of the virtual machine, a hibernation of the virtual machine, a de-hibernation of the virtual machine, a migration of the virtual machine, a disconnection of a virtual device from the virtual machine, and a disconnection of a virtual device to the virtual machine.

9. A system, comprising:
   a memory to store a script; and
   a processing device, operatively coupled with the memory, to:
      identify a first type of event of a plurality of types of events occurring on a virtual machine being supported by a host system, each of the plurality of types of events being different from each other of the plurality of types of events;
      identify a location of the host system that is associated with the identified first type of event that has occurred with the virtual machine provided by the host system;
      identify a script corresponding to the identified first type of event and at the location of the host system that is associated with the identified first type of event, wherein the script is configured to be executed in accordance with the first type of event of the plurality of types of events;
      receive a property of a virtual device that is assigned to the virtual machine, wherein the property comprises an operating status of the virtual device assigned to the virtual machine;
      determine whether to execute the script for the virtual machine in view of the property of the virtual device that is assigned to the virtual machine satisfying a condition in the script; and
      in response to determining that a value of the property of the virtual device that is assigned to the virtual machine satisfies the condition in the script, execute the script in accordance with the first type of event to perform an operation on the virtual device of the virtual machine in view of a property of the host system.

10. The system of claim 9, wherein the script is determined to not be executed when a value of the property of the virtual device assigned to the virtual machine does not satisfy the condition in the script.

11. The system of claim 9, the processing device is further to:
identify a second virtual machine associated with the event; and
receive a second property of a second virtual device assigned to the second virtual machine, wherein the executing of the script performs an operation on the second virtual machine when the second property of the second virtual device assigned to the second virtual machine satisfies the condition in the script.

12. The system of claim 11, wherein the executing of the script does not perform the operation on the second virtual machine when the second property of the second virtual device assigned to the second virtual machine does not satisfy the condition.

13. The system of claim 9, wherein the event is an action performed on the virtual machine at the host system.

14. The system of claim 9, wherein the plurality of types of events comprises a stopping of the virtual machine, a start of the virtual machine, a destruction of the virtual machine, a pausing of the virtual machine, an unpausing of the virtual machine, a hibernation of the virtual machine, a de-hibernation of the virtual machine, a migration of the virtual machine, a disconnection of a virtual device from the virtual machine, and a disconnection of a virtual device to the virtual machine.

15. A non-transitory machine-readable storage medium comprising data that, when accessed by a processing device, cause the processing device to:
identify a first type of event of a plurality of types of events occurring on a virtual machine being supported by a host system, each of the plurality of types of events being different from each other of the plurality of types of events;
identify a location of the host system that is associated with the identified first type of event that has occurred with the virtual machine provided by the host system;
identify the script corresponding to the identified first type of event and at the location of the host system that is associated with the identified first type of event, wherein the script is configured to be executed in accordance with the first type of event of the plurality of types of events;
receive a property of a virtual device that is assigned to the virtual machine, wherein the property comprises an operating status of the virtual device assigned to the virtual machine;
determine whether to execute the script for the virtual machine in view of the property of the virtual device that is assigned to the virtual machine satisfying a condition in the script; and
in response to determining that a value of the property of the virtual device that is assigned to the virtual machine satisfies the condition in the script, execute the script in accordance with the first type of event to perform an operation on the virtual device of the virtual machine in view of a property of the host system.

16. The non-transitory machine-readable storage medium of claim 15, wherein the script is determined to not be executed when a value of the property of the virtual device assigned to the virtual machine does not satisfy the condition in the script.

17. The non-transitory machine-readable storage medium of claim 15, wherein the processing device is further to:
identify a second virtual machine associated with the event; and
receive a second property of a second virtual device assigned to the second virtual machine, wherein the executing of the script performs an operation on the second virtual machine when the second property of the second virtual device assigned to the second virtual machine satisfies the condition in the script.

18. The non-transitory machine-readable storage medium of claim 17, wherein the executing of the script does not perform the operation on the second virtual machine when the second property of the second virtual device assigned to the second virtual machine does not satisfy the condition.

19. The non-transitory machine-readable storage medium of claim 15, wherein the plurality of types of events comprises a stopping of the virtual machine, a start of the virtual machine, a destruction of the virtual machine, a pausing of the virtual machine, an unpausing of the virtual machine, a hibernation of the virtual machine, a de-hibernation of the virtual machine, a migration of the virtual machine, a disconnection of a virtual device from the virtual machine, and a disconnection of a virtual device to the virtual machine.

* * * * *